(12) United States Patent
Ben David et al.

(10) Patent No.: US 11,575,707 B2
(45) Date of Patent: Feb. 7, 2023

(54) SYSTEM AND METHOD FOR BLOCKING PHISHING ATTEMPTS IN COMPUTER NETWORKS

(71) Applicant: IntSights Cyber Intelligence Ltd., Tel Aviv (IL)

(72) Inventors: Gal Ben David, Petah Tikva (IL); Amir Hozez, Ganei Tiqwa (IL); Alon Arvatz, Raanana (IL); Guy Nizan, New York, NY (US)

(73) Assignee: IntSights Cyber Intelligence Ltd., Tel Aviv (IL)

( * ) Notice: Subject to any disclaimer, the term of this patent is extended or adjusted under 35 U.S.C. 154(b) by 163 days.

(21) Appl. No.: 16/770,626

(22) PCT Filed: Dec. 18, 2018

(86) PCT No.: PCT/IL2018/051369
§ 371 (c)(1),
(2) Date: Jun. 8, 2020

(87) PCT Pub. No.: WO2019/123455
PCT Pub. Date: Jun. 27, 2019

(65) Prior Publication Data
US 2021/0176274 A1   Jun. 10, 2021

Related U.S. Application Data

(60) Provisional application No. 62/599,803, filed on Dec. 18, 2017.

(51) Int. Cl.
*H04L 29/06* (2006.01)
*H04L 9/40* (2022.01)

(52) U.S. Cl.
CPC ...... *H04L 63/1483* (2013.01); *H04L 63/0236* (2013.01); *H04L 63/126* (2013.01); *H04L 63/1433* (2013.01)

(58) Field of Classification Search
CPC ............ H04L 63/1483; H04L 63/0236; H04L 63/126; H04L 63/1433
(Continued)

(56) References Cited

U.S. PATENT DOCUMENTS

| 2008/0133540 A1* | 6/2008 | Hubbard ............. H04L 63/1483 |
| 2009/0064325 A1* | 3/2009 | Ford ................... H04L 63/1425 726/22 |

(Continued)

OTHER PUBLICATIONS

Jo, Insoon; Jung, Im Y; Yeom, Heon Y. Efficient Classification Scheme for Detecting Malicious Websites (Year: 2013).*

(Continued)

*Primary Examiner* — Andrew J Steinle
(74) *Attorney, Agent, or Firm* — Wolf, Greenfield & Sacks, P.C.

(57) ABSTRACT

Systems and methods of blocking phishing attempts in a computer network, including receiving a list of assets of the computer network, wherein each asset is associated with at least one computer network address, generating at least one address permutation on the at least one computer network address of each asset of the computer network, wherein the generated at least one address permutation is different from the address associated with each asset of the computer network, receiving a communication request at a gateway server of the computer network, determining a destination address of the communication request, comparing the determined destination address with the at least one address permutation, and when the determined destination address is the same as at least one address permutation, blocking the communication request at the gateway server.

20 Claims, 6 Drawing Sheets

(58) Field of Classification Search
USPC .......................................................... 726/22
See application file for complete search history.

(56) References Cited

U.S. PATENT DOCUMENTS

2009/0094677 A1* 4/2009 Pietraszek ........... H04L 63/1408
                                                            726/2
2017/0126730 A1    5/2017 Oberheide

OTHER PUBLICATIONS

International Search Report of Application No. PCT/IL2018/051369 dated Mar. 17, 2019.

* cited by examiner

Receiving a list of assets of the computer network, wherein each asset is associated with at least one computer network address
401

Generating at least one address permutation on the at least one computer network address of each asset of the computer network
402

Receiving a communication request at a gateway server of the computer network
403

Determining a destination address of the communication request
404

Comparing the determined destination address with the at least one address permutation
405

When the determined destination address is the same as at least one address permutation, blocking the communication request at the gateway server
406

Fig. 4

SYSTEM AND METHOD FOR BLOCKING PHISHING ATTEMPTS IN COMPUTER NETWORKS

CROSS-REFERENCE TO RELATED APPLICATIONS

This application is a National Phase Application of PCT International Application No. PCT/IL2018/051369, International Filing Date Dec. 18, 2018, claiming the benefit of U.S. Patent Application No. 62/599,803, filed Dec. 18, 2017, which are hereby incorporated by reference.

FIELD OF THE INVENTION

The present invention relates to malicious attacks in computer systems. More particularly, the present invention relates to systems and methods for blocking of phishing attempts.

BACKGROUND OF THE INVENTION

Phishing attempts have become very common in recent years, where sensitive information (e.g., account details or passwords) are maliciously retrieved from users while disguising as a trustworthy entity. For instance, such attempts are typically carried out with email spoofing and/or direction of users to fake websites.

Some commercially available solutions employ a mechanism to detect phishing domains based on their similarity to a general concept of known phishing domains without considering the customer's original domains However, such general methods do not consider the original information of the potential target, for example the domains that the attacker attempts to disguise to.

SUMMARY OF THE INVENTION

There is thus provided, in accordance with some embodiments of the invention, a method of blocking phishing attempts in a computer network, the method may include: receiving, by a processor, a list of assets of the computer network, wherein each asset is associated with at least one computer network address, generating, by the processor, at least one address permutation on the at least one computer network address of each asset of the computer network, wherein the generated at least one address permutation is different from the address associated with each asset of the computer network, receiving, by the processor, a communication request at a gateway server of the computer network, determining, by the processor, a destination address of the communication request, comparing, by the processor, the determined destination address with the at least one address permutation, and when the determined destination address is the same as at least one address permutation, blocking the communication request at the gateway server.

In some embodiments, the at least one address permutation may be compared with a list of predetermined phishing addresses in a database coupled to the processor. the at least one address permutation with a list of predetermined phishing addresses in a database coupled to the processor. An address may be determined as a phishing address to be added to the database when the address includes an invalid SSL certification. The destination address may be at least one of an email address and a website address.

In some embodiments, generation of the address permutation may include at least one of homoglyph generation, character repetition, character omission, typographical error, context similarity, bit squatting and address suffix permutation. A phishing attempt probability rank may be calculated, wherein the phishing attempt probability rank may be calculated based on at least one of: visual design code, popularity of the website, validity of SSL certifications and address availability. The communication request may be blocked at the gateway server when the calculated phishing attempt probability rank exceeds a predetermined threshold.

There is thus provided, in accordance with some embodiments of the invention, a system for blocking phishing attempts in a computer network with at least one gateway server, the system may include: a processor, in communication with the at least one gateway server, wherein the processor is configured to: receive a list of assets of the computer network, wherein each asset is associated with at least one computer network address, generate at least one address permutation on the at least one computer network address of each asset of the computer network, wherein the generated at least one address permutation is different from the address associated with each asset of the computer network, receive a communication request at the gateway server, determine a destination address of the communication request, compare the determined destination address with the at least one address permutation, and when the determined destination address is the same as at least one address permutation, block the communication request at the gateway server.

In some embodiments, the destination address may be at least one of email address and website address. A database may be in communication with the processor and including a list of predetermined phishing addresses, and wherein the processor may be configured to determine an address as a phishing address to be added to the database when the address includes an invalid SSL certification.

In some embodiments, the processor may be configured to generate the address permutation with at least one of homoglyph generation, character repetition, character omission, typographical error, context similarity, bit squatting and address suffix permutation. The processor may be configured to determine the origin of the communication request. The processor may be configured to calculate a phishing attempt probability rank, wherein the phishing attempt probability rank is calculated based on at least one of: visual design code, popularity of the website, validity of SSL certifications and address availability. The processor may be configured to block the communication request at the gateway server when the calculated phishing rank exceeds a predetermined threshold.

There is thus provided, in accordance with some embodiments of the invention, a method of determining phishing attempts in a computer network, the method may include: receiving, by a processor, a list of assets of the computer network, wherein each asset is associated with at least one computer network address, generating, by the processor, at least one address permutation on the at least one computer network address of each asset of the computer network, wherein the generated at least one address permutation is different from the address associated with each asset of the computer network, receiving, by the processor, a communication request at a gateway server of the computer network, determining, by the processor, a destination address of the communication request, obtaining at least one IP address corresponding to the generated at least one address permutation, and when the obtained at least one IP address is associated with a phishing address, determining that the destination address is associated with a phishing address.

In some embodiments, an address may be determined as a phishing addresses when the address includes an invalid SSL certification. The destination address may include at least one of email address and website address. In some embodiments, generation of the address permutation may include at least one of homoglyph generation, character repetition, character omission, typographical error, context similarity, bit squatting and address suffix permutation. In some embodiments, the origin of the communication request may be determined. A phishing attempt probability rank may be calculated, wherein the phishing rank may be calculated based on at least one of: visual design code, popularity of the website, validity of SSL certifications and address availability.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF EMBODIMENTS OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method embodiments described herein are not constrained to a particular order or sequence. Additionally, some of the described method embodiments or elements thereof can occur or be performed simultaneously, at the same point in time, or concurrently.

Figure 1:
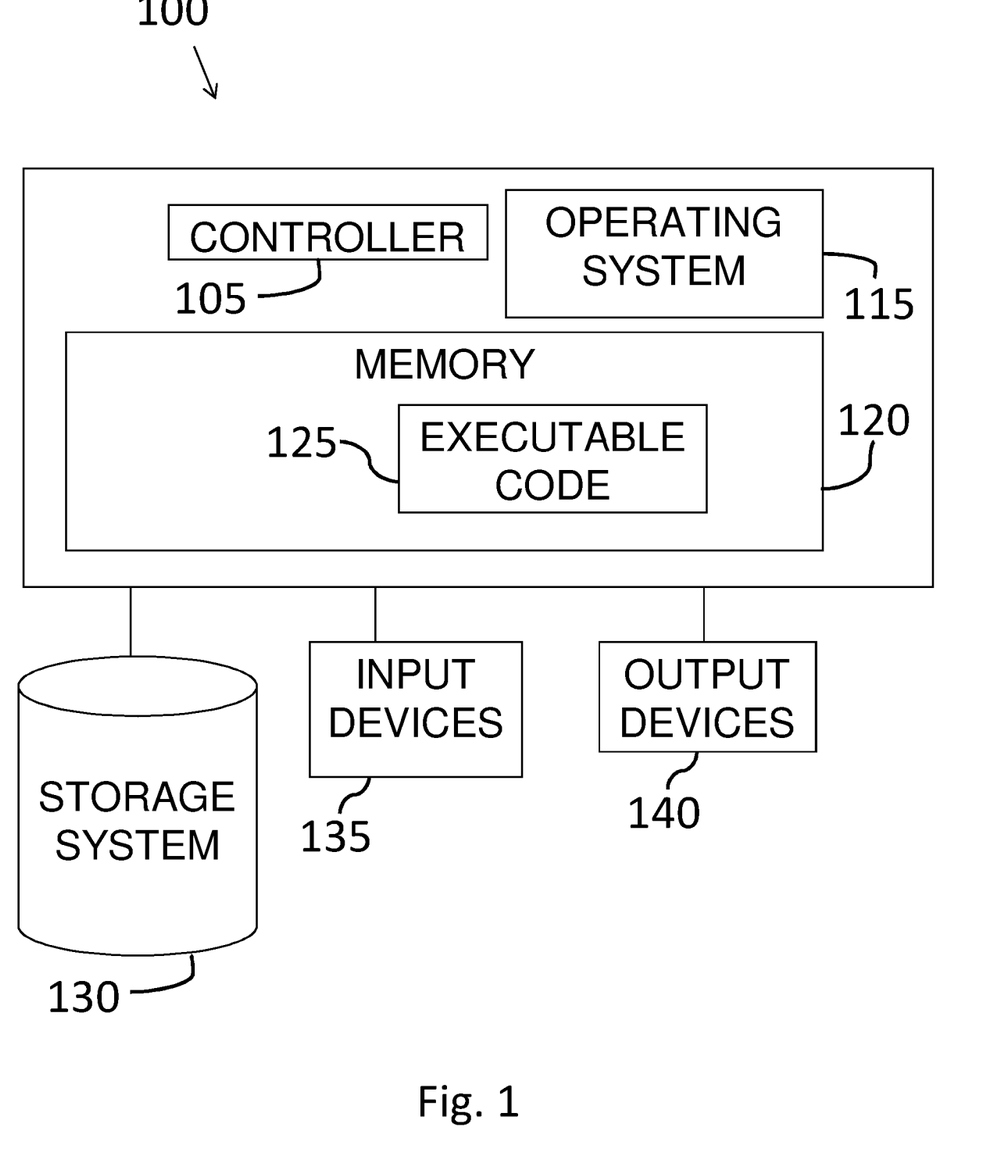
FIG. 1 shows a block diagram of an examplary computing device, according to some embodiments of the invention.

Reference is made to FIG. 1, which shows a block diagram of an example of a computing device, according to some embodiments of the invention. A device 100 may include a controller 105 that may be, for example, a central processing unit processor (CPU), a chip or any suitable computing or computational device, an operating system 115, a memory 120, executable code 125, a storage system 130 that may include input devices 135 and output devices 140. Controller 105 (or one or more controllers or processors, possibly across multiple units or devices) may be configured to carry out methods described herein, and/or to execute or act as the various modules, units, etc. More than one computing device 100 may be included in, and one or more computing devices 100 may act as the components of, a system according to embodiments of the invention.

Operating system 115 may be or may include any code segment (e.g., one similar to executable code 125 described herein) designed and/or configured to perform tasks involving coordination, scheduling, arbitration, supervising, controlling or otherwise managing operation of computing device 100, for example, scheduling execution of software programs or tasks or enabling software programs or other modules or units to communicate. Operating system 115 may be a commercial operating system. It will be noted that an operating system 115 may be an optional component, e.g., in some embodiments, a system may include a computing device that does not require or include an operating system 115. For example, a computer system may include a microcontroller, an application specific circuit (ASIC), a field programmable array (FPGA) and/or system on a chip (SOC) that may be used without an operating system.

Memory 120 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 120 may be or may include a plurality of, possibly different memory units. Memory 120 may be a computer or processor non-transitory readable medium, or a computer non-transitory storage medium, e.g., a RAM.

Executable code 125 may be any executable code, e.g., an application, a program, a process, task or script. Executable code 125 may be executed by controller 105 possibly under control of operating system 115. For example, executable code 125 may be an application that detects cyber-attacks as further described herein, for example, for phishing attempts at computer networks. Although, for the sake of clarity, a single item of executable code 125 is shown in FIG. 1, a system according to some embodiments of the invention may include a plurality of executable code segments similar to executable code 125 that may be loaded into memory 120 and cause controller 105 to carry out methods described herein.

Storage system 130 may be or may include, for example, a flash memory as known in the art, a memory that is internal to, or embedded in, a micro controller or chip as known in the art, a hard disk drive, a universal serial bus (USB) device or other suitable removable and/or fixed storage unit. Content may be stored in storage system 130 and may be loaded from storage system 130 into memory 120 where it may be processed by controller 105. In some embodiments, some of the components shown in FIG. 1 may be omitted. For example, memory 120 may be a non-volatile memory having the storage capacity of storage system 130. Accordingly, although shown as a separate component, storage system 130 may be embedded or included in memory 120.

Input devices 135 may be or may include any suitable input devices, components or systems, e.g., a detachable keyboard or keypad, a touchscreen, a mouse and the like. Output devices 140 may include one or more (possibly detachable) displays or monitors, speakers and/or any other suitable output devices. Any applicable input/output (I/O) devices may be connected to computing device 100 as shown by blocks 135 and 140. For example, a wired or wireless network interface card (NIC), a universal serial bus (USB) device or external hard drive may be included in input devices 135 and/or output devices 140. It will be recognized that any suitable number of input devices 135 and output device 140 may be operatively connected to computing device 100 as shown by blocks 135 and 140. For example, input devices 135 and output devices 140 may be used by a technician or engineer in order to connect to a computing device 100, update software and the like.

Embodiments of the invention may include an article such as a computer or processor non-transitory readable medium, or a computer or processor non-transitory storage medium, such as for example a memory, a disk drive, or a USB flash memory, encoding, including or storing instructions, e.g., computer-executable instructions, which, when executed by a processor or controller, carry out methods disclosed herein. For example, a storage medium such as memory 120, computer-executable instructions such as executable code 125 and a controller such as controller 105.

The storage medium may include, but is not limited to, any type of disk including magneto-optical disks, semiconductor devices such as read-only memories (ROMs), random access memories (RAMs), such as a dynamic RAM (DRAM), erasable programmable read-only memories (EPROMs), flash memories, electrically erasable programmable read-only memories (EEPROMs), magnetic or optical cards, or any type of media suitable for storing electronic instructions, including programmable storage devices.

Embodiments of the invention may include components such as, but not limited to, a plurality of central processing units (CPU) or any other suitable multi-purpose or specific processors or controllers (e.g., controllers similar to controller 105), a plurality of input units, a plurality of output units, a plurality of memory units, and a plurality of storage units. A system may additionally include other suitable hardware components and/or software components. In some embodiments, a system may include or may be, for example, a personal computer, a desktop computer, a mobile computer, a laptop computer, a notebook computer, a smartphone, a terminal, a workstation, a server computer, a Personal Digital Assistant (PDA) device, a tablet computer, a network device, or any other suitable computing device.

In some embodiments, a system may include or may be, for example, a plurality of components that include a respective plurality of central processing units, e.g., a plurality of CPUs as described, a plurality of CPUs embedded in an on board, or in-vehicle, system or network, a plurality of chips, FPGAs or SOCs, a plurality of computer or network devices, or any other suitable computing device. For example, a system as described herein may include one or more devices such as the computing device 100.

Figure 2A:
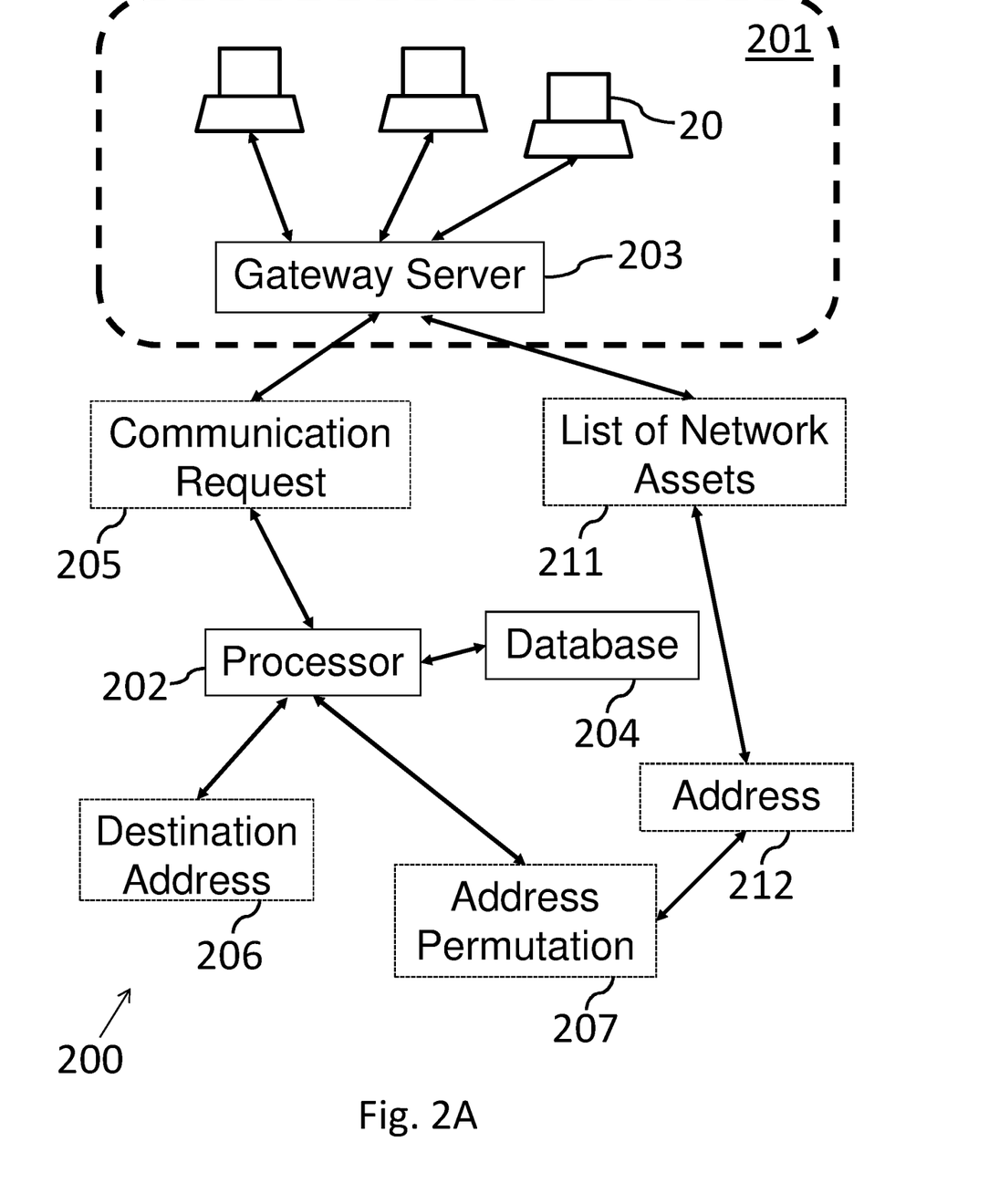
FIGS. 2A-2B show block diagrams of a system for blocking phishing attempts in a computer network, according to some embodiments of the invention.

Reference is made to FIG. 2A which shows a block diagram of a system 200 for blocking phishing attempts in a computer network 201, according to some embodiments of the invention. System 200 may include at least one processor 202 (e.g., such as controller 105 shown in FIG. 1) in communication with at least one gateway server 203 of computer network 201 (e.g., a computer network of a commercial organization with at least one computer 20). System 200 may be configured to block phishing attempts against the computer network 201, such as phishing emails and/or phishing websites that resemble legitimate assets or elements of computer network 201. Assets of computer network 201 may include at least one of emails, webpages, servers, etc. In some embodiments, the direction of arrows in FIG. 2A may indicate the direction of information flow.

It should be noted that while the gateway server 203 is described in some of the following embodiments, the same may apply to any kind of node in the computer network 201, that receives requests for communication with external sources, for example via firewalls and/or proxy servers. In some embodiments, processor 202 may execute dedicated algorithms to block phishing attempts. The algorithm to detect and/or block phishing attempts may be implemented onto the organization's local area network (LAN) and include the firewall's current IP address and/or other credentials for configuration. For example, processor 202 may receive as input credentials of computer network 201 (e.g., IP addresses, servers, URLs, etc.) to automatically generate possible phishing assets or elements that resemble the original assets of computer network 201.

In some embodiments, processor 202 may pull new phishing domains from online databases (e.g., dedicates cloud based databases), create the appropriate blocking rule for each threatening address and/or domain and may synchronize based on the firewall that it integrates to.

System 200 may include at least one database 204 (e.g., such as storage system 130 shown in FIG. 1), in communication with processor 202, and configured to store a list of predetermined phishing addresses (e.g., addresses that were previously determined as associated with phishing activity). In some embodiments, communication between processor 202 and at least one of gateway server 203 and database 204 may be carried out with a dedicated communication module, for instance allowing at least partially wireless communication.

According to some embodiments, the at least one processor 202 may receive communication requests 205 arriving at the at least one gateway server 203, for instance to detect and/or block phishing attempts of these communication requests 205. A phishing attempt may be for instance an attempt to create a phishing webpage with a URL similar to a URL of a legitimate webpage of the organization associated with the computer network 201, and for example make employees of that organization unknowingly enter their credentials in the false phishing webpage. For example, an employee of the organization associated with the computer network 201 may unknowingly try to connect to an external source (e.g., an employee trying to open a hyperlink received via email message), such that a communication request from that employee may be received by the at least one gateway server 203. Processor 202 may determine at least one destination address 206 (e.g., address of a website or email) from the received communication requests 205, for instance based on information in the data packet of the communication request 205. Processor 202 may analyze the relation between the determined at least one destination address 206 and assets or elements of the computer network 201 to determine if communication to the determined at least one destination address 206 is a phishing attempt.

In some embodiments, processor 202 may generate at least one address permutation 207 of the determined destination address 206. In some embodiments, processor 202 may receive a list of assets 211 of computer network 201 and generate at least one permutation 207 (e.g., permutation in the name or address of the asset) on at least one asset of computer network 201, for instance permutations on a URL of a webpage or on an email associated with the computer network 201. The generated at least one address permutation may be different from the address of each asset of the computer network 201, for instance to prevent the case that the computer network 201 includes two webpages with similar names and one of them will be tagged as a phishing address if it is a permutation of the other webpage.

For example, an employee of the organization "Telephone LTD" associated with the computer network 201 may activate a hyperlink and try to access a webpage with the destination URL address "Telefon.com" that is possibly a phishing address. This phishing address may be automatically detected and blocked by system 200 if the destination URL address is compared to permutations of the legitimate URL address "Telephone.com" of the computer network of the organization Telephone LTD". Similarly, phishing email addresses may be blocked with permutations of the legitimate email address.

In some embodiments, address permutations by processor 202 may allow detection of all possible phishing addresses and/or domains related to the computer network 201 (e.g., related to the name of the organization), by comparison of phishing addresses to address permutation of asset addresses of the computer network 201, regardless if these addresses are actively launching an attack against the organization.

In some embodiments, processor 202 may compare at least one address permutation 207 with the determined destination address 206, such that if the determined destination address is the same as at least one address permutation 207, processor 202 may determine that address as a phishing address and block communication requests 205 with that destination address at the gateway server 203. In case that the at least one address permutation 207 is not the same as the determined destination address 206, processor 202 may validate the corresponding destination address 206 and thereby allow the communication request 205.

In some embodiments, processor 202 may compare at least one address permutation 207 with the list of predetermined phishing addresses in the database 204, such that if the at least one address permutation 207 is in the database 204, processor 202 may determine that address as a phishing address and block communication requests 205 with that destination address at the gateway server 203. It should be noted that processor 202 may block addresses based on predetermined phishing addresses in the database 204 and/or block addresses based on the at least one address permutation 207 that may be related to the organization of computer network 201 (e.g., phishing addresses related to the name of the organization).

In case that the at least one address permutation 207 is not in the database 204, processor 202 may validate the corresponding destination address 206 and thereby allow the communication request 205. In some embodiments, processor 202 may add validated destination addresses 206 to a whitelist of non-phishing addresses.

In some embodiments, processor 202 may try to connect to at least one destination address 206 (e.g., already determined as a phishing address) to train and/or verify that the phishing detection algorithm detects actual phishing attempts.

According to some embodiments, determination of a phishing address may be carried out by processor 202 (e.g., executing dedicated code and/or computer program), in parallel and/or in addition to comparison of addresses to lists in database 204.

Figure 2B:
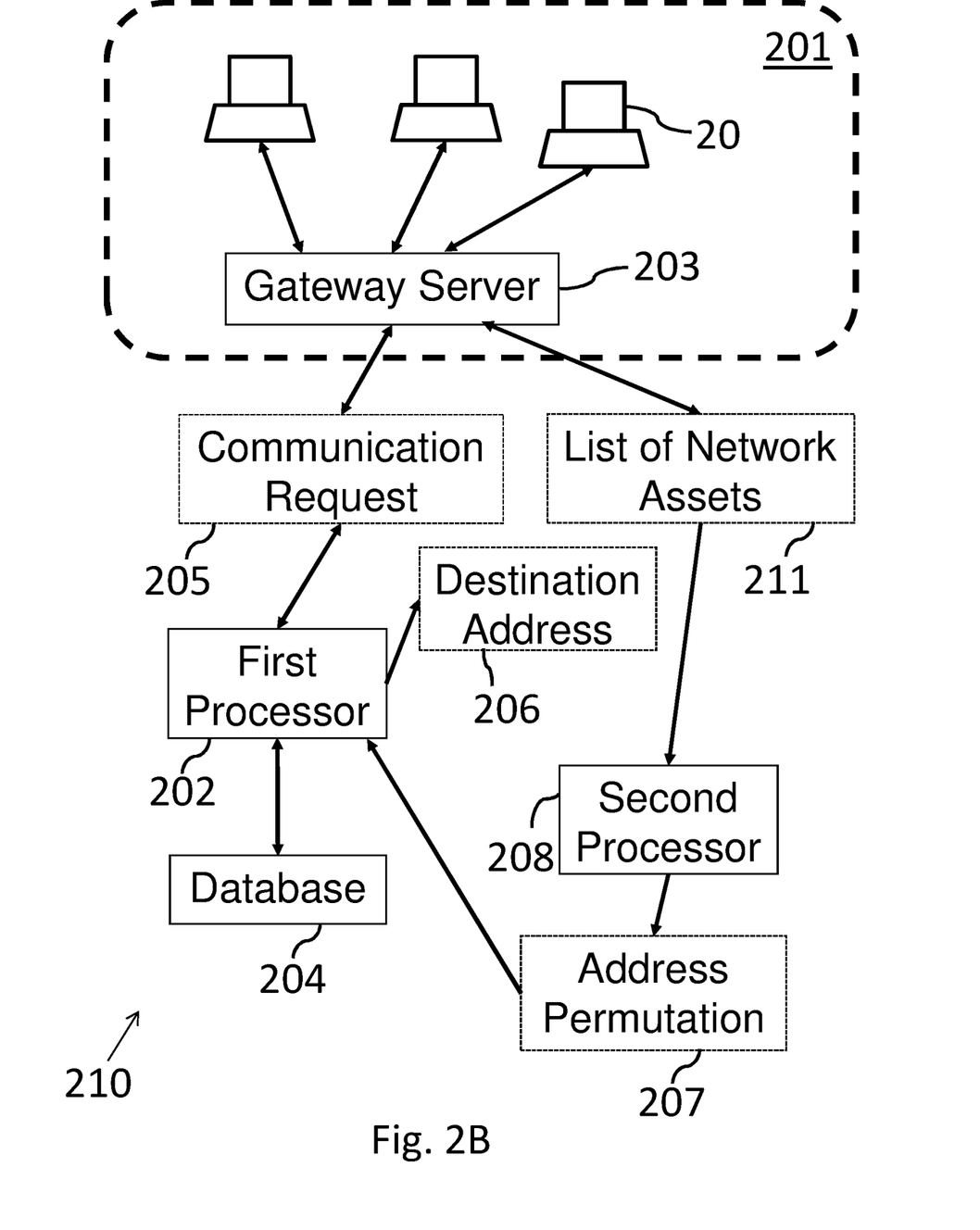

Reference is made to FIG. 2B which shows a block diagram of another system 210 for blocking phishing attempts in a computer network 201, according to some embodiments of the invention. System 210 may include at least one first processor 202 (e.g., such as controller 105 shown in FIG. 1) in communication with at least one gateway server 203 of computer network 201. In some embodiments, at least some elements of system 210 may have the same structure and/or operation as corresponding elements in the system 200, for instance the database 204, communication request 205 destination address 206 and list of network assets 211 of computer network 201.

The at least one first processor 202 may determine at least one destination address 206 from the received communication requests 205. According to some embodiments, at least one second processor 208 may receive a list of assets 211 of computer network 201 and generate at least one address permutation 207 of at least one address of each asset of computer network 201. The generated at least one address permutation may be different from the address of each asset of the computer network 201, for instance to prevent the case that the computer network 201 includes two webpages with similar names and one of them will be tagged as a phishing address if it is a permutation of the other webpage.

In some embodiments, the at least one first processor 202 may receive and compare at least one address permutation 207 with the determined destination address 206, such that if the determined destination address is the same as at least one address permutation 207, the at least one first processor 202 may determine that address as a phishing address and block communication requests 205 with that destination address at the gateway server 203. In case that the at least one address permutation 207 is not the same as the determined destination address 206, the at least one first processor 202 may validate the corresponding destination address 206 and thereby allow the communication request 205.

In some embodiments, the at least one first processor 202 may receive and compare at least one address permutation 207 with the list of predetermined phishing addresses in the database 204, such that if the at least one address permutation 207 is in the database 204, the at least one first processor 202 may determine that address as a phishing address and block the communication request 205 at the gateway server 203. It should be noted that at least one first processor 202 may block addresses based on predetermined phishing addresses in the database 204 and/or addresses based on the at least one address permutation 207 that may be related to the organization of computer network 201 (e.g., phishing address related to the name of the organization).

In some embodiments, at least one second processor 208 may try to connect to at least one destination address 206 (e.g., determined as a phishing address) to train and/or verify phishing detection algorithm detects actual phishing attempts. According to some embodiments, determination of a phishing address may be carried out by at least one first processor 202 and/or second processor 208 (e.g., executing dedicated code and/or computer program), in parallel and/or in addition to comparison of addresses to lists in database 204.

Figure 3A:
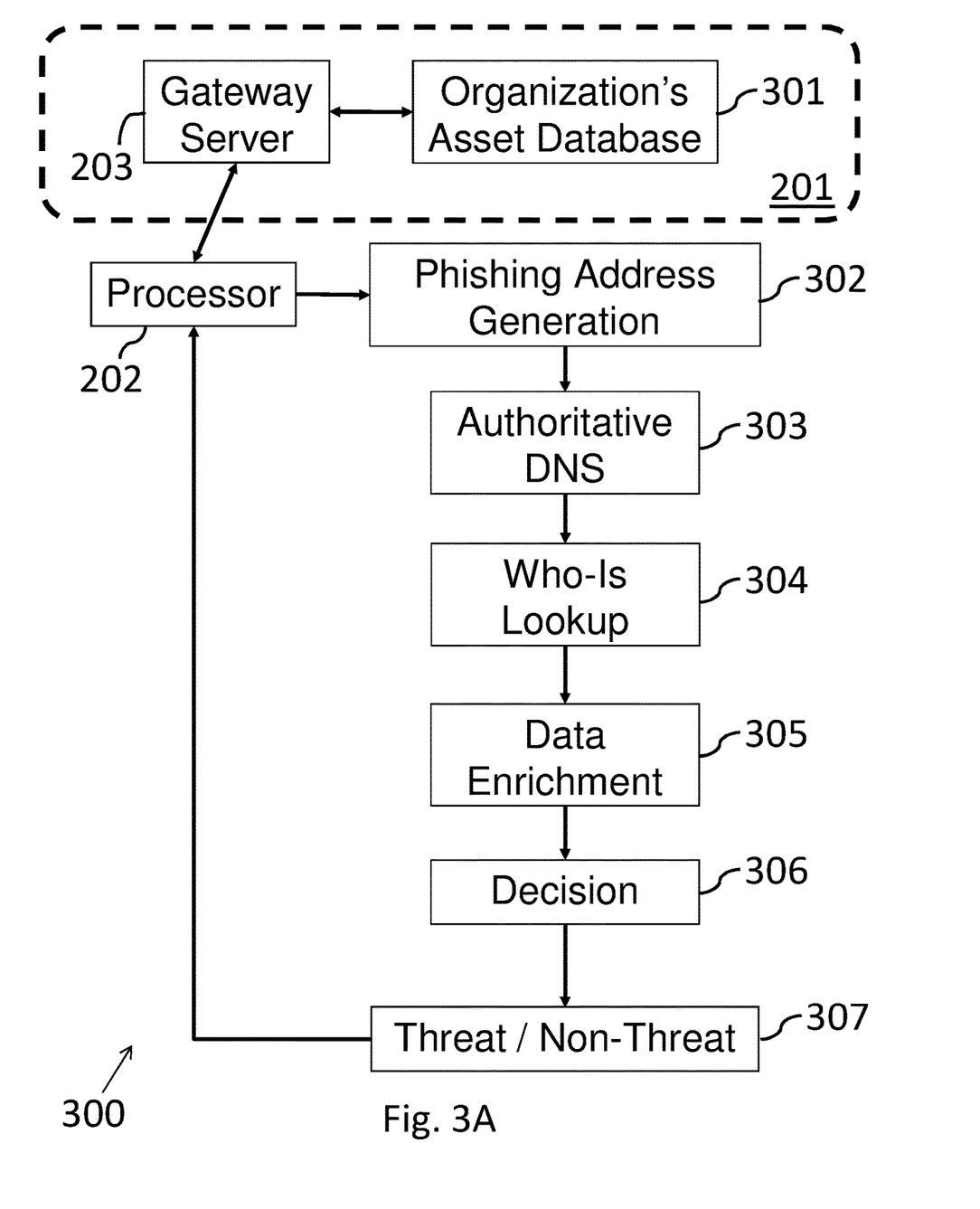
FIGS. 3A-3B show block diagrams of a system for detection phishing attempts in the computer network, according to some embodiments of the invention.

Reference is made to FIG. 3A which shows a block diagram of a system 300 for detection phishing attempts in the computer network 201, according to some embodiments of the invention. System 300 may include the at least one processor 202 in communication with at least one gateway server 203 of computer network 201, and configured to execute at least one algorithm to detect phishing attempts. In some embodiments, the direction of arrows in FIG. 3A may indicate the direction of information flow, for instance in a pipelined system.

Computer network 201 may include at least one organization's asset database 301 with the list of network assets 211, for instance coupled to gateway server 203, that may include a list of different assets (e.g., servers, terminals, databases, web-pages etc.) in the organization associated with the computer network 201. For example, assets in the at least one organization's asset database 301 may be predetermined prior to operation of the system 300. In some embodiments, processor 202 may receive input data from organization's asset database 301, for instance, via the gateway server 203.

In some embodiments, the at least one organization's asset database 301 may be external to computer network 201 such that input data therein may be shared with processor 202 via a dedicated communication channel, for instance to generate at least one address permutation 207. In some embodiments, processor 202 may compare at least one address permutation 207 with the list of predetermined phishing addresses in the database 204, such that if the at least one address permutation 207 is in the database 204, the processor 202 may block the communication request 205 with that destination address at the gateway server 203.

According to some embodiments, input data (e.g., including assets in computer network 201) from processor 202 may be transferred to a phishing address generation engine 302, configured to generate potential phishing addresses (e.g., phishing domains and/or emails). The phishing address generation engine 302 may determine addresses that may resemble genuine addresses associated with computer network 201.

In some embodiments, generation of potential phishing addresses may be carried out with at least one of the following methods: zone file enumerations, comparison with online databases of phishing domains, email address permutation and address similarity generation. Zone file enumerations may include access to available '.com' and/or '.net' domains and enumerating these files in order to find domains that may resemble genuine addresses associated with computer network 201 using for instance regular expression techniques.

Comparison with online databases of known phishing domains may include sending queries to such known phishing domains in order to find phishing addresses related to genuine addresses associated with computer network 201.

Email address permutation may include generation of email addresses based on predetermined (e.g., VIP) emails. A separation may be made between the username and the domain such that the domain may be replaced with outstanding mail domains and/or addresses such as: "Gmail", "Outlook", "Yahoo", etc. For example, the email address "steve.jobs@apple.com" may be permutated to generate "steve.jobs@gmail.com," "jobs.steve@yahoo.com", etc. The determined permutated address may be validated, with the corresponding domains, at a later time so as to understand if such address has been registered.

Address similarity generation may include generation of various possible permutations that resemble genuine addresses associated with computer network 201 both textually and/or phonetically. Such permutations may include at least one of: homoglyph generation, similar sound, character repetition, proximity insertion and/or proximity replacement, omission, bit squatting, domain suffix, transposition, common addition, joined top level domain (TLD), organization name manipulations and vowel and/or non-vowel addition.

The similar sound technique may substitute characters with characters that have a similar sound, for example "taptalk" may be substituted with "tabtalk", "tuptalk", etc. The characters repetition technique may include typing the same character at least two times, for example "google" may be substituted with "ggoogle", "googlee", etc. The proximity insertion/replacement technique may include a character with a close proximity in a qwerty close keyboard, for example "12" may be substituted with "12q", and "google" may be substituted with "foogle", "googlw", etc. The omission technique may include omitting the typing of at least one character, for example "google" may be substituted with "goole", "googl", etc. The bit squatting technique may include hardware errors leading to invalid domain name system (DNS) request to be sent where each character corresponds to a single bit, for example "google" may be substituted with "googlu. The domain suffix technique may include permutations on possible domain suffixes of a given record, for example "vodafone.com" may be substituted with "vodafone.co.uk", "vodafone.co.il", etc. The transposition technique may include replacement of at least two adjacent characters, for example "google" may be substituted with "ogolge", "ogogle", etc. The common addition technique may include addition of common terms to domain names with possible separators, for example "vodafone" may be substituted with "vodafone-network", "support-vodafone" etc. The joined TLD technique may include concatenating the TLS to the net location, for example "vodafone.co.uk" may be substituted with "vodafonecouk", "wwwvodafone", "vodafone-co-uk", "www0vodafone0co0uk" etc. The organization name manipulation technique may include permutating the organization name to create domains therefrom, while removing other known suffixes, for example "vodafone Group LTD" may be substituted with "vodafone-group", "vodafone-group", "vodafone-group-ltd", etc. The vowl/npn-vowl addition technique may include addition of vowls/non-vowls, for example "vodafone-i" may be substituted with "avodafone", "a-vodafone", "vodafone-b", etc.

Figure 3B:
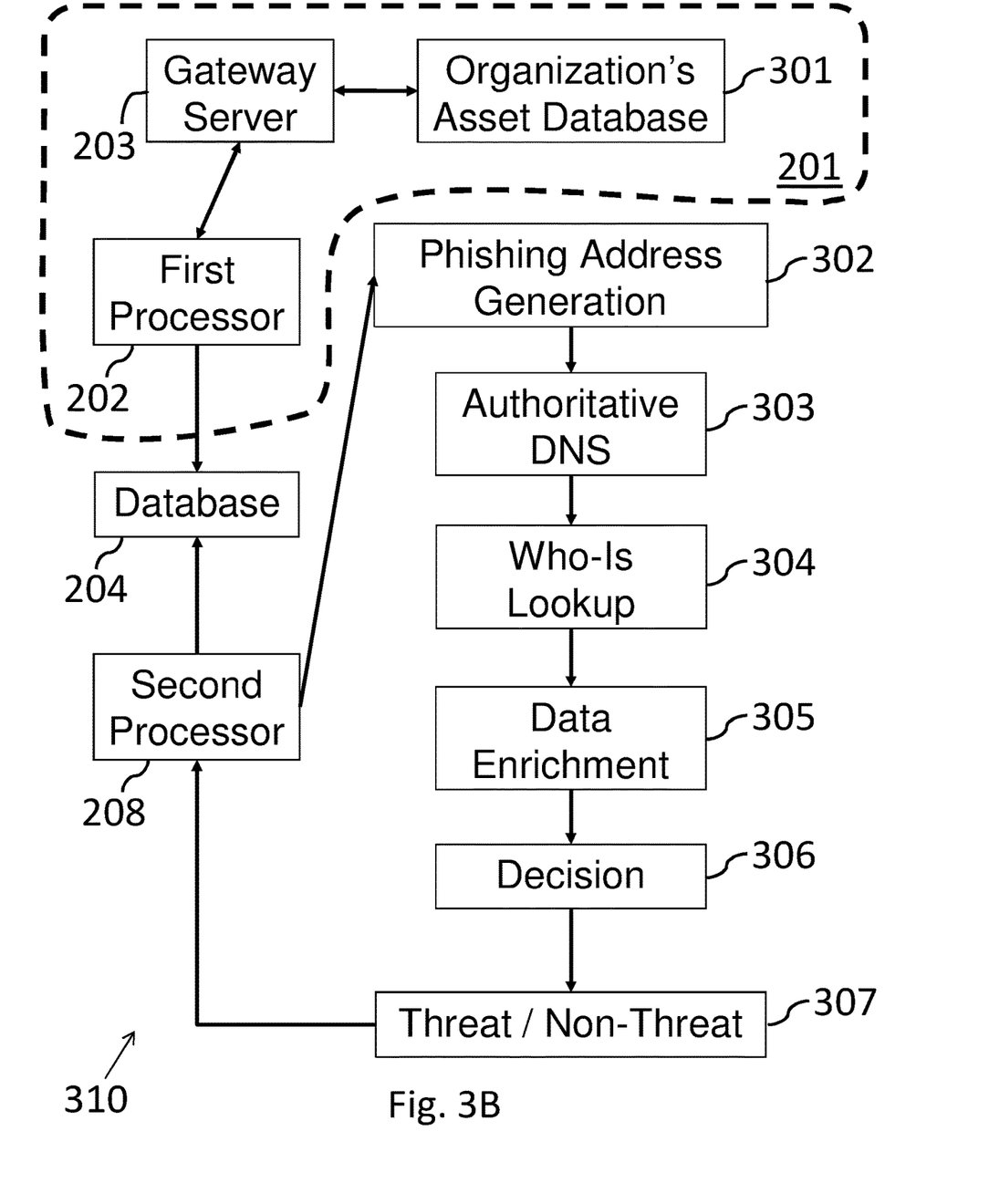

Reference is made to FIG. 3B which shows a block diagram of another system 310 for detection phishing attempts in the computer network 201, according to some embodiments of the invention. In some embodiments, at least some elements of system 310 may have the same structure and/or operation as corresponding elements in the system 300, for instance the gateway server 203 and the organization's asset database 301. System 310 may include at least one first processor 202 (e.g., such as controller 105 shown in FIG. 1) in communication with at least one gateway server 203 of computer network 201, and configured to communicate with database 204 with the list of predetermined phishing addresses.

In some embodiments, system 310 may include a second processor 208 to receive data from database 204 such that input data (e.g., including list of assets 211 in computer network 201) from second processor 208 may be transferred to a phishing address generation engine 302, configured to generate potential phishing addresses (e.g., phishing domains and/or emails).

According to some embodiments, authoritative DNS query 303 may be performed by processor 202. For instance, a DNS authoritative query may be conducted in order to obtain the IP address behind potential phishing addresses (e.g., after phishing address generation 302 check is performed).

According to some embodiments, a "WhoIs" lookup 304 may be performed by at least one first processor 202. A "WhoIs" open source library may be provided in order to normalize different "WhoIs" responses from all "WhoIs" servers around the world into one simple response (e.g., to allow simple parsing of queries and corresponding responses). Thus, this library may be utilized in order to conduct a lookup to obtain at least one of the following information about the potential phishing domain (e.g., after authoritative DNS query 303 check is performed): creation date, updated date, expiration date, registrar name, registrant name, etc.

According to some embodiments, data enrichment 305 may be performed by at least one first processor 202. For instance, data from the input model may be enriched by collecting crucial information to be used in the next phases (e.g., after phishing address generation 302 check is performed. Such information may include at least one of the following: obtaining a secure-sockets-layer (SSL) certificate, validation of the SSL certificate, detecting the Alexa rank of a website, performing a domain 'Bing' search including obtaining the results from entering this domain in 'Bing', performing a domain record 'Bing' search including removing the TLD and conducting the 'Bing' search, performing a domain record 'Google' search suggestions including placing this domain in 'Google' and obtaining its suggestions, counting the number of redirections (and/or referrals), performing a site domain 'Bing' search including searching the domain in 'Bing' under conditions of that site, and retrieving the website for that domain According to some embodiments, a decision 306 may be determined by at least one first processor 202. For instance, including calculations and analysis of various fundamentals that may be used later to make a final decision (e.g., after data enrichment 305 is performed). In some embodiments, decision 306 may include feature extraction with analysis of the potential phishing address (e.g., URL), including a score for textual visual similarity may be calculated between the potential phishing address and the original domain (e.g., comparing "v0daf0ne.com" to "vodafone.com"), a score for linguistic context similarity may be calculated between the potential phishing domain and the original domain (e.g., comparing "o2-phones.co.uk" to "o2.co.uk"), a score for typing error proximity may be calculated between the potential phishing domain and the original domain (e g , comparing "mastercard.com.br" to "mastrrcrd.com.br").

In some embodiments, decision 306 may include analysis of the potential phishing domain website, with detection of website availability (e.g., detecting if the website is offered for sale, if the website does not exist, etc.), a score for website popularity that may be calculated based on at least one of Alexa rank, number of pages, TLD popularity, SSL certificate validity, and a score for visual design code that may be calculated based on at least one of: usage of popular HTML elements, usage of Javascript code, usage of CSS elements, number of images, number of complex HTML elements, amount of text, and amount of links In some embodiments, an address may be determined as a phishing address to be added to the database when the address includes an invalid SSL certification.

In some embodiments, decision 306 may include rule based decisions, with a set of rules that may detect a phishing domain under high probability based on at least one of: high score of textual visual similarity and low website popularity score, high score of linguistic context similarity and no website availability, and high score of typing error proximity and low website popularity score. In some embodiments, decision 306 may include a statistical decision that may be determined based on a tagged dataset including a large number of phishing domains which may be tagged as phishing or non-phishing by specialized analysts with supervised learning so as to enable machine learning algorithms to utilize such datasets. In some embodiments, upon determination of threat/non-threat 307 by at least one first processor 202, the system 300 for detection of phishing attempts may determine whether to allow communication with the corresponding communication request. In some embodiments, decision 306 may include calculation of a phishing attempt probability score, or rank, of probability of a phishing attempt, wherein the phishing attempt probability rank may be calculated based on at least one of: visual design code (e.g., complexity of code), popularity of the website, SSL certifications validity and address availability. Processor 202 may block the communication request at the gateway server when the calculated phishing attempt probability rank exceeds a predetermined threshold, for example the phishing attempt probability rank may be calculated based on parameters such as popularity of the website, SSL certifications validity, etc., and a threshold may be predefined as an indication of a phishing attempt based on these parameters.

Figure 4:
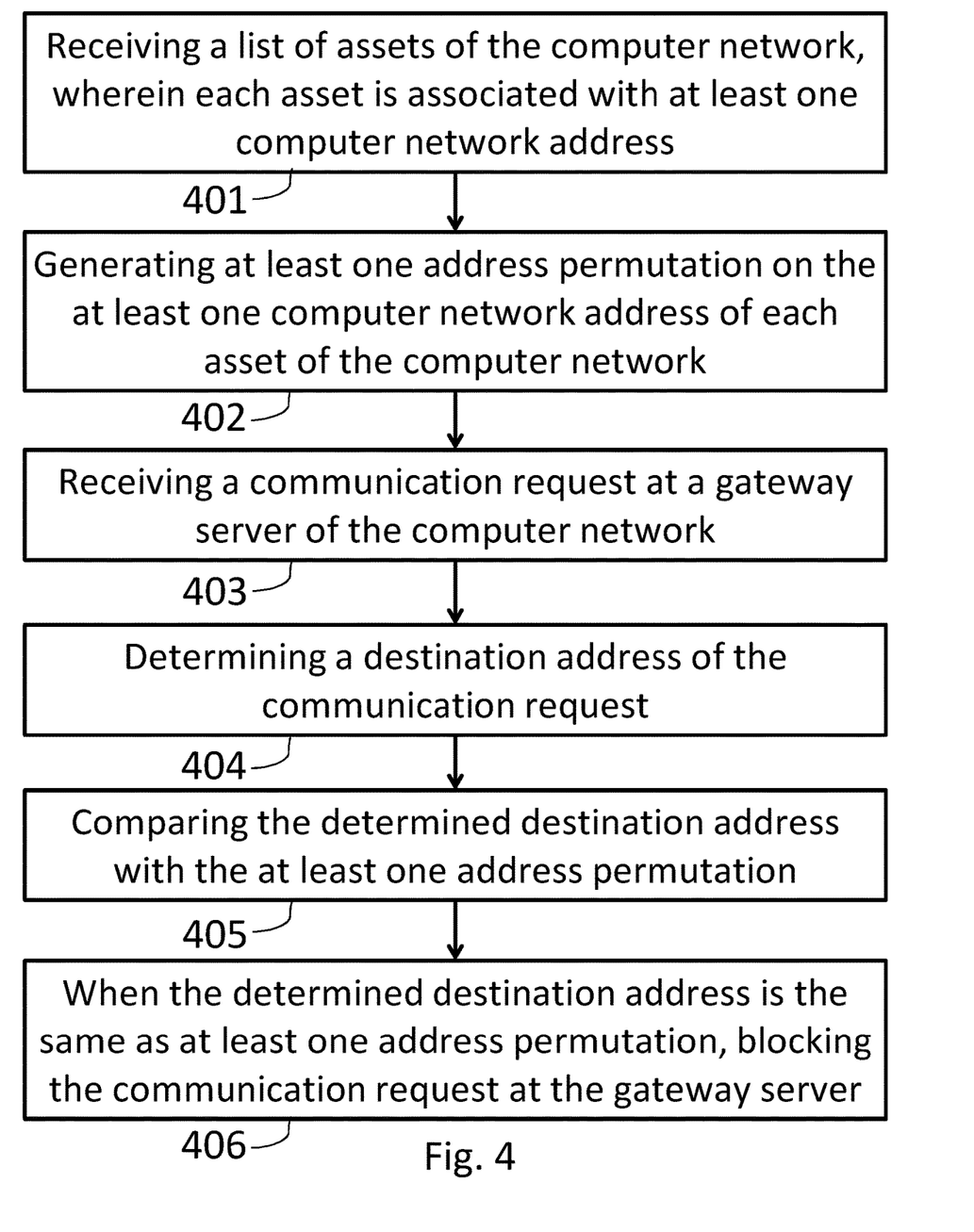
FIG. 4 shows a flowchart of a method of blocking phishing attempts, according to some embodiments of the invention.

Reference is made to FIG. 4 which shows a flowchart of a method of blocking phishing attempts, according to some embodiments of the invention. In some embodiments, a list of assets of the computer network 211 may be received 401 (e.g., by the processor 202) from a gateway server 203 of the computer network 201, wherein each asset may be associated with at least one computer network address.

In some embodiments, at least one address permutation 207 may be generated 402 on the at least one computer network address 212 of each asset of the computer network 201, wherein the generated at least one address permutation is different from the address of each asset of the computer network 201.

In some embodiments, a communication request 205 may be received 403 (e.g., by the processor 202) at a gateway server 203 of the computer network 201. In some embodiments, a destination address 206 of the communication request 205 may be determined 404 (e.g., by the processor 202).

In some embodiments, the determined destination address 206 may be compared 405 with the at least one address permutation 207. In some embodiments, the communication request 205 may be blocked 406 at the gateway server 203 if the determined destination address is the same as the at least one address permutation 207.

Unless explicitly stated, the method embodiments described herein are not constrained to a particular order in time or chronological sequence. Additionally, some of the described method elements may be skipped, or they may be repeated, during a sequence of operations of a method.

Various embodiments have been presented. Each of these embodiments may of course include features from other

The invention claimed is:

1. A method of blocking phishing attempts in a computer network, the method comprising:
  receiving, by a processor, a list of assets of the computer network, wherein each asset is associated with at least one computer network address, the list of assets comprising a first asset associated with a first computer network address;
  generating, by the processor, at least one address permutation on the first computer network address of the first asset of the computer network, wherein the generated at least one address permutation is different from the first computer network address associated with the first asset of the computer network;
  receiving, by the processor, separately from the list of assets, a communication request at a gateway server of the computer network, the communication request comprising data indicative of a destination address;
  comparing, by the processor, the destination address with the at least one address permutation; and
  when the destination address is the same as an address permutation in the at least one address permutation, blocking the communication request at the gateway server.

2. The method of claim 1, further comprising comparing, by the processor, the at least one address permutation with a list of predetermined phishing addresses in a database coupled to the processor.

3. The method of claim 2, further comprising: determining an address as a phishing address to add to the database when the address comprises an invalid SSL certification.

4. The method of claim 1, wherein the destination address is at least one of an email address and a website address.

5. The method of claim 1, wherein generation of the address permutation comprises at least one of homoglyph generation, character repetition, character omission, typographical error, context similarity, bit squatting, and address suffix permutation.

6. The method of claim 1, further comprising calculating a phishing attempt probability rank, wherein the phishing attempt probability rank is calculated based on at least one of: visual design code, popularity of a website, validity of SSL certifications, and address availability.

7. The method of claim 6, further comprising blocking the communication request at the gateway server when the calculated phishing attempt probability rank exceeds a predetermined threshold.

8. A system for blocking phishing attempts in a computer network with at least one gateway server, the system comprising:
  a hardware processor, in communication with the at least one gateway server, wherein the hardware processor is configured to:
    receive a list of assets of the computer network, wherein each asset is associated with at least one computer network address, the list of assets comprising a first asset associated with a first computer network address;
    generate at least one address permutation on the first computer network address of the first asset of the computer network, wherein the generated at least one address permutation is different from the first computer network address associated with the first asset of the computer network;
    receive, separately from the list of assets, a communication request at the gateway server, the communication request comprising data indicative of a destination address;
    compare the destination address with the at least one address permutation; and
    when the destination address is the same as an address permutation in the at least one address permutation, block the communication request at the gateway server.

9. The system of claim 8, wherein the destination address is at least one of an email address and a website address.

10. The system of claim 8, further comprising a database, in communication with the hardware processor and comprising a list of predetermined phishing addresses, and wherein the processor is configured to determine an address as a phishing address to add to the database when the address comprises an invalid SSL certification.

11. The system of claim 8, wherein the hardware processor is configured to generate the address permutation with at least one of homoglyph generation, character repetition, character omission, typographical error, context similarity, bit squatting, and address suffix permutation.

12. The system of claim 8, wherein the hardware processor is configured to determine an origin of the communication request.

13. The system of claim 8, wherein the hardware processor is configured to calculate a phishing attempt probability rank, wherein the phishing attempt probability rank is calculated based on at least one of: visual design code, popularity of a website, validity of SSL certifications and address availability.

14. The system of claim 13, wherein the hardware processor is configured to block the communication request at the gateway server when the calculated phishing rank exceeds a predetermined threshold.

15. A non-transitory storage medium storing executable instructions that when executed by a processor cause the processor to perform a method of blocking phishing attempts in a computer network, the method comprising:
  receiving a list of assets of the computer network, wherein each asset is associated with at least one computer network address, the list of assets comprising a first asset associated with a first computer network address;
  generating at least one address permutation on the first computer network address of the first asset of the computer network, wherein the generated at least one address permutation is different from the first computer network address associated with the first asset of the computer network;
  receiving separately from the list of assets, a communication request at a gateway server of the computer network, the communication request comprising data indicative of a destination address;
  comparing the destination address with the at least one address permutation; and
  when the destination address is the same as an address permutation in the at least one address permutation, blocking the communication request at the gateway server.

16. The non-transitory storage medium of claim 15, wherein the method further comprises comparing, by the processor, the at least one address permutation with a list of predetermined phishing addresses in a database coupled to the processor.

17. The non-transitory storage medium of claim 15, wherein the destination address is at least one of an email address and a website address.

18. The non-transitory storage medium of claim 15, wherein generation of the address permutation comprises at least one of homoglyph generation, character repetition, character omission, typographical error, context similarity, bit squatting, and address suffix permutation.

19. The non-transitory storage medium of claim 15, wherein the method further comprises calculating a phishing attempt probability rank, wherein the phishing attempt probability rank is calculated based on at least one of: visual design code, popularity of a website, validity of SSL certifications, and address availability.

20. The non-transitory storage medium of claim 19, wherein the method further comprises blocking the communication request at the gateway server when the calculated phishing attempt probability rank exceeds a predetermined threshold.

* * * * *